Feb. 5, 1957 J. VAN SLOOTEN 2,780,669
TELEVISION RECEIVER HAVING SUPERREGENERATIVE DETECTION OF THE SOUND SIGNAL
Filed March 1, 1952
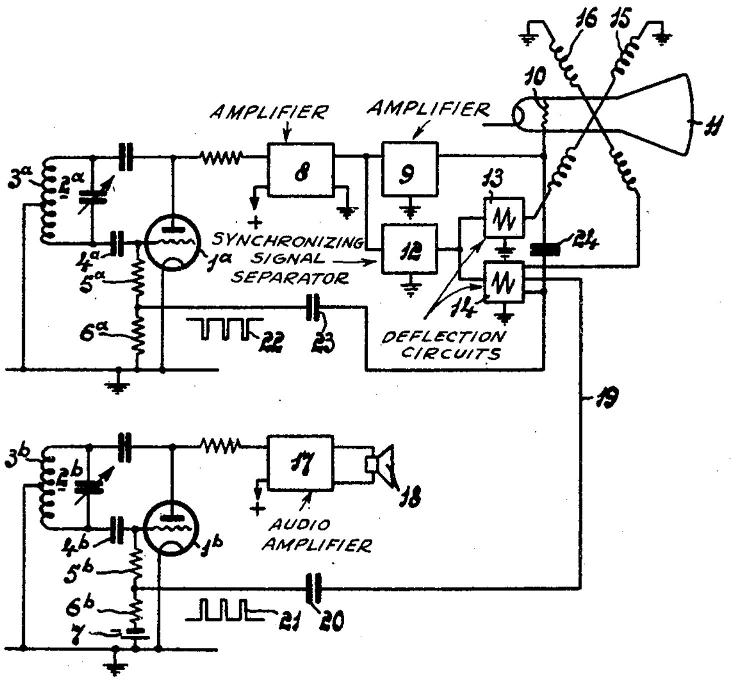
INVENTOR
Jacob Van Slooten
By Fred M Vogel
Agent

United States Patent Office 2,780,669

Patented Feb. 5, 1957

2,780,669

TELEVISION RECEIVER HAVING SUPERREGENERATIVE DETECTION OF THE SOUND SIGNAL

Jacob van Slooten, Eindhoven, Netherlands, assignor to Hartford National Bank and Trust Company, Hartford, Conn., as trustee Application March 1, 1952, Serial No. 274,430

Claims priority, application Netherlands March 10, 1951

2 Claims. (Cl. 178—5.8)

If, in a television receiver, it is desired to use superregenerative detection of both the sound signal and the image signal a number of problems arise.

If separate self-extinguishing detectors are used, these detectors will in general interfere with one another, since frequently one produces a voltage pulse at an instant when the other is sensitive.

If the two oscillators are not self-extinguishing, the use of a common extinguishing oscillator will eliminate this interference but the resultant circuit is more complex. As an alternative, two self-extinguishing detectors which are synchronized with each other may be used, but the one requires a high interruption frequency for the sound detector, so that the sensitivity decreases.

Television receivers wherein the image signal is not detected by superregenerative means are known in which the sound signal is detected superregeneratively for at least a portion of the line suppression interval.

The object of the invention is to provide a receiver of the last-mentioned kind, in which superregenerative image detection can also be carried out.

A television receiver according to the invention, having superregenerative detection of the sound signal for at least a portion of the image line suppression interval, is characterized in that it comprises a superregenerative detector for the image signal, which is made inoperative for at least the said portion of the line suppression interval.

Since the image detector does not operate in the period in which the sound detector is sensitive, the detectors cannot interfere with each other.

The invention comprises, briefly, a television receiver having a sound channel containing a normally inoperative superregenerative detector, an image channel containing a normally operative superregenerative detector, and a line deflection generator which generates positive and negative pulses during at least a portion of the line-suppression intervals, the positive pulses being fed to the sound detector to render it operative during the line-suppression intervals, and the negative pulses being fed to the image detector to render it inoperative during the line-suppression intervals. Thus, the sensitivity and other advantages of superregenerative detectors are obtained in both the image and the sound channels, without undesirable interaction therebetween.

In order that the invention may be more clearly understood and readily carried into effect, it will now be described more fully with reference to the accompanying drawing, in which one embodiment is shown partly diagrammatically.

The receiver comprises two discharge tube $1^a$ and $1^b$, each of which is included in a manner known per se in a superregenerative circuit. Corresponding parts of the two circuits have the same reference numerals and to distinguish between them they are provided with references *a* and *b*.

Each of the tubes 1 forms part of a Hartley oscillator; for this purpose a resonant circuit 2 is connected, for high frequencies, between the anode and the control-grid of the tube and a tap of the coil 3 of the circuit 2 is connected to the cathode of the tube.

The control-grid circuits comprise a grid capacitor 4 and a leak resistor comprising the parts 5 and 6, the circuit of tube $1^b$ including a negative bias voltage source 7 in series with the leak resistor.

An antenna (not shown) is inductively coupled with the coils $3^a$ and $3^b$.

The circuit comprising the tube $1^a$ is operative for image detection and that comprising the tube $1^b$ for sound detection.

The output circuit of the image detector comprises two amplifying stages 8 and 9. The output voltage of the stage 9 is supplied to the control-grid 10 of a cathode-ray tube 11.

The output voltage of the amplifying stage 8 is supplied in known manner to a circuit 12 for separating the image signals and the synchronizing signals. The field deflection circuit 13 and the line deflection circuit 14 are synchronized through use of the output voltage of the stage 12.

The output portion of the circuit 13 comprises the field deflection coils 15 and the output part of the circuit 14 comprises the line deflection coils 16.

The output circuit of the sound detector comprises a low-frequency amplifier 17, having a limit frequency which is lower than the line frequency, the output circuit of this amplifier comprising a loudspeaker 18.

By the correct choice of the value of the capacitor $4^a$ and of the resistors $5^a$ and $6^a$ the image detector is self-extinguishing with an extinguishing frequency which preferably exceeds the maximum field frequency of the image to be received, so that this extinguishing frequency falls outside the bandpass of the amplifying stages 8 and 9.

The sound detector is rendered normally inoperative by a negative bias voltage from the source of voltage 7.

A pulsatory voltage 21, which occurs during the line-suppression interval is now taken from the line deflection circuit 14 through lead 19 and capacitor 20 and is supplied to the resistor $6^b$ with a positive polarity.

Thus the effect of the negative bias voltage is eliminated by the positive-polarity pulses of the voltage 21 and sound detection may take place during this period.

Since, in the conventional television systems, the line frequency is 12,000 cycles or more, a sufficiently large frequency range of sound signals can be detected without interference by the pulsatory voltage 21.

In order to prevent interference with the sound detection owing to the pulses of the image detector, a second pulsatory voltage is taken from the line-deflection circuit 14.

This voltage 22 is supplied via the capacitor 23 to the resistor $6^a$ with negative polarity of the pulses, so that at least during sound detection the image detector is inoperative. As shown in the drawing, the negative pulses of voltage 22 occur at substantially the same times as the positive pulses of voltage 21.

If necessary, the same voltage 22 may also be supplied through a capacitor 24 to the control-grid of the cathode-ray tube 11, in order to cut off the latter during the line-suppression interval.

The required pulsatory voltages may be taken in known manner from the stage 14, for example, if the coils 16 are fed through a transformer at the primary winding and the secondary winding thereof.

What I claim is:

1. In a television receiver for intercepting carrier waves modulated respectively and simultaneously by a sound signal and an image signal, said image signal having an image component and a pulse component, said pulse component including pulses which represent the periodic line suppression intervals of said image signal, a sound channel provided with a first superregenerative detector for detecting said sound signal, and an image channel provided with a second regenerative detector for detecting said image signal, said image channel further including pulse separating means coupled to said second detector and responsive solely to said pulse component in the detected signal, pulse-producing means connected to said last-named means to produce two pulsatory voltages each containing impulses each time the pulses representing said intervals are present and means connected to supply said pulsatory voltages as respective control voltages to said first and second detectors in a polarity to render said first detector operative during at least a portion of each of said intervals and in a polarity to render said second detector inoperative during the time said first detector is operative.

2. A television receiver as set forth in claim 1, wherein said pulse-producing means comprises a phase-inverting device connected to generate one of said pulsatory voltages from the other said pulsatory voltage, whereby said pulsatory voltages are phased in opposing polarity.

No references cited.